(12) United States Patent
Ballas et al.

(10) Patent No.: US 7,537,422 B2
(45) Date of Patent: May 26, 2009

(54) CUTTING TOOL AND ADAPTOR

(75) Inventors: Assaf Ballas, Akko (IL); Carol Smilovici, Naharyia (IL); David Feldman, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 27 days.

(21) Appl. No.: 11/695,306

(22) Filed: Apr. 2, 2007

(65) Prior Publication Data
US 2007/0231097 A1 Oct. 4, 2007

(30) Foreign Application Priority Data
Apr. 2, 2006 (IL) ........................ 174721
Mar. 11, 2007 (IL) ........................ 181834

(51) Int. Cl.
B23Q 11/10 (2006.01)
(52) U.S. Cl. .............. 409/136; 279/8; 279/20; 408/59; 408/61; 408/233; 407/11; 409/234
(58) Field of Classification Search ........ 409/232, 409/234, 136; 408/57, 59, 238, 233, 239 R, 408/239 A, 61; 279/8, 20; 407/11, 40, 47, 407/48; B23Q 11/10
See application file for complete search history.

(56) References Cited

U.S. PATENT DOCUMENTS 2,282,596 A * 5/1942 Wise et al. .............. 175/412
2,867,140 A * 1/1959 Getts .......................... 408/57
4,720,216 A 1/1988 Smith
4,921,376 A * 5/1990 Tani et al. .................. 409/131
6,896,450 B2 * 5/2005 Rothenstein ................ 408/59
7,004,692 B2 2/2006 Hecht
2002/0009339 A1 1/2002 Arvidsson
2005/0152752 A1 * 7/2005 Tran .......................... 407/34

FOREIGN PATENT DOCUMENTS

| EP | 0599393 | 11/1993 |
|---|---|---|
| GB | 2332161 | 12/1997 |
| JP | 2001138107 A * | 5/2001 |
| JP | 2004276136 A * | 10/2004 |
| JP | 2004338000 A * | 12/2004 |
| WO | WO 9206817 A2 * | 4/1992 |
| WO | WO 0214005 | 2/2002 |
| WO | WO 2007003248 | 1/2007 |
| WO | WO 2007/104549 | 3/2007 |

OTHER PUBLICATIONS

International Search Report, PCT/Il2007/000422, dated Jul. 30, 2007.

* cited by examiner

*Primary Examiner*—Daniel W Howell
(74) *Attorney, Agent, or Firm*—Womble Carlyle

(57) ABSTRACT

An adaptor (20, 76, 104, 106) secures a cutting head (16) to a tool holder (12, 14) having a passage for fluid. The adaptor (20, 76, 104, 106) has a corresponding passage (68, 94) for fluid to which a nozzle (22) is connected for the distribution of fluid towards a cutting region (54) of the cutting head (16).

20 Claims, 8 Drawing Sheets

CUTTING TOOL AND ADAPTOR

RELATED APPLICATIONS

This application claims the benefit of the filing date of Israel Patent Application No. 174721 filed Apr. 2, 2006, and Israel Patent Application No. 181834 filed Mar. 11, 2007, each of which are hereby incorporated in their entirety herein.

FIELD OF THE INVENTION

The invention relates generally to cutting tools and, more particularly, to the provision of a cooling fluid to a cutting tool operation.

BACKGROUND

Machining work pieces through the use of rotating cutting tools, especially those rotating at high speeds, can cause a large build up of heat in the workpiece and cutting tool. To combat the heat build up, it is known to provide a fluid to the cutting tool and/or workpiece to cool those elements.

Many cutting heads, however, are not configured with a fluid passage or other way to direct fluid to a cutting area. Generally, the cutting heads are secured to a tool holder, or optionally, to a machine spindle directly using a screw. In such a case, the screw prevents provision of fluid towards the cutting region of the cutting head from the machine spindle because the screw is not provided with a corresponding channel for fluid. Such cutting heads eliminate or restrict the ability to use fluid during a cutting operation for cooling or chip-removal purposes.

Figure 1:
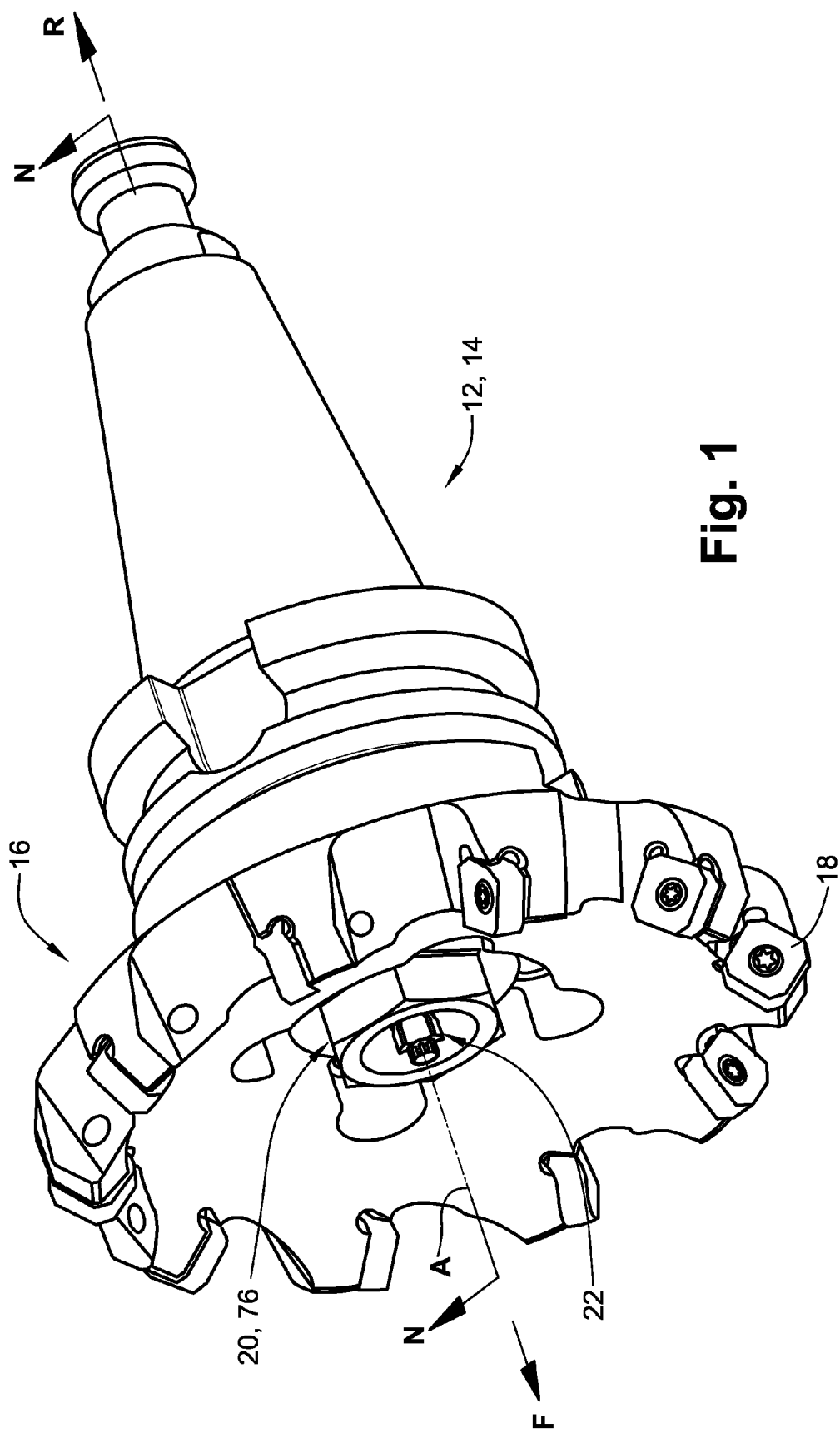
FIG. 1 shows a perspective view of a cutting tool having a cutting head secured to a tool holder.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements. It is intended that the embodiments and figures disclosed herein are to be considered illustrative, rather than restrictive.

DETAILED DESCRIPTION OF THE PREFERRED EMBODIMENTS

Figure 4:
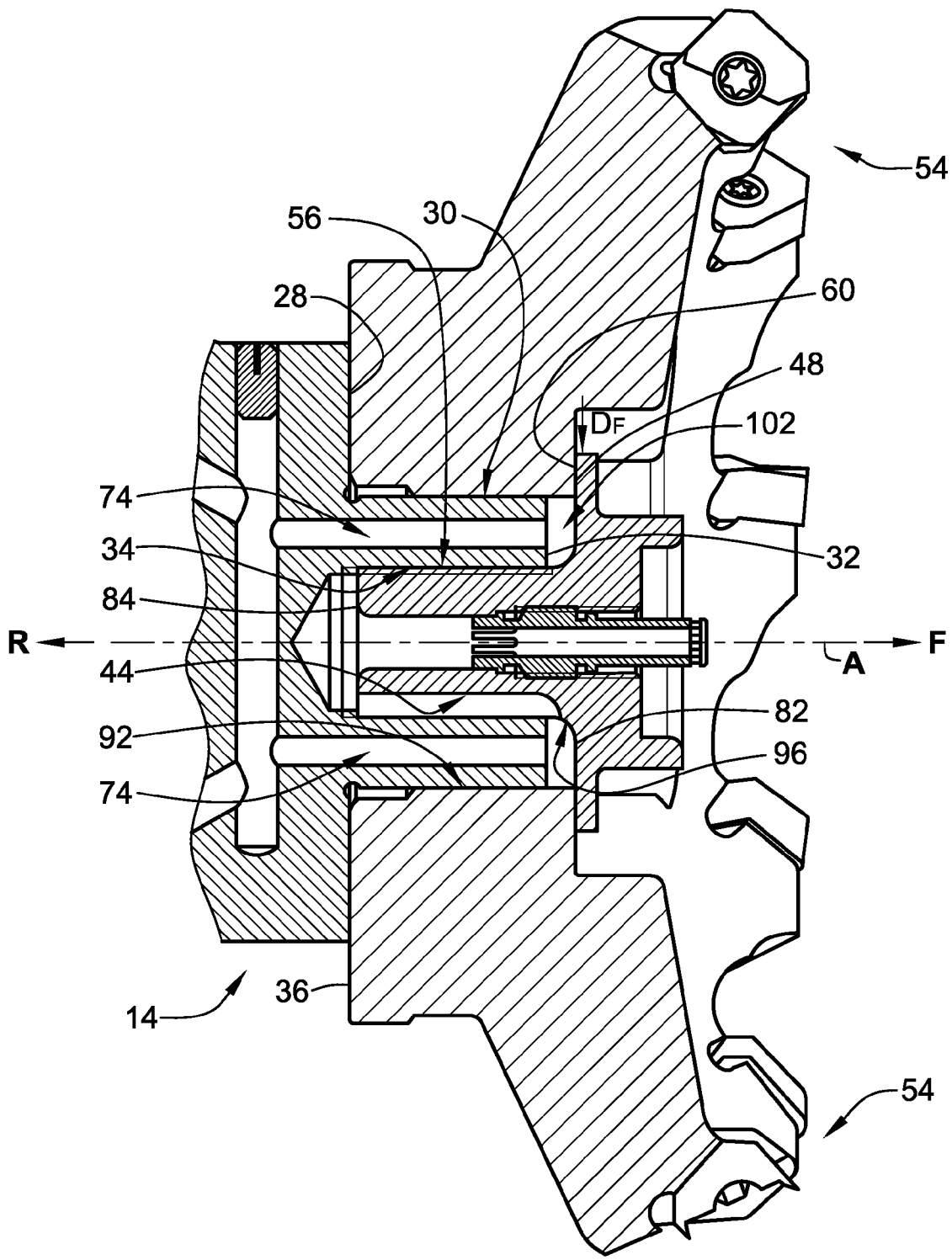
FIG. 4 shows a cross sectional view of an alternate cutting tool taken in the plane N-N embodiment.
Figure 5:
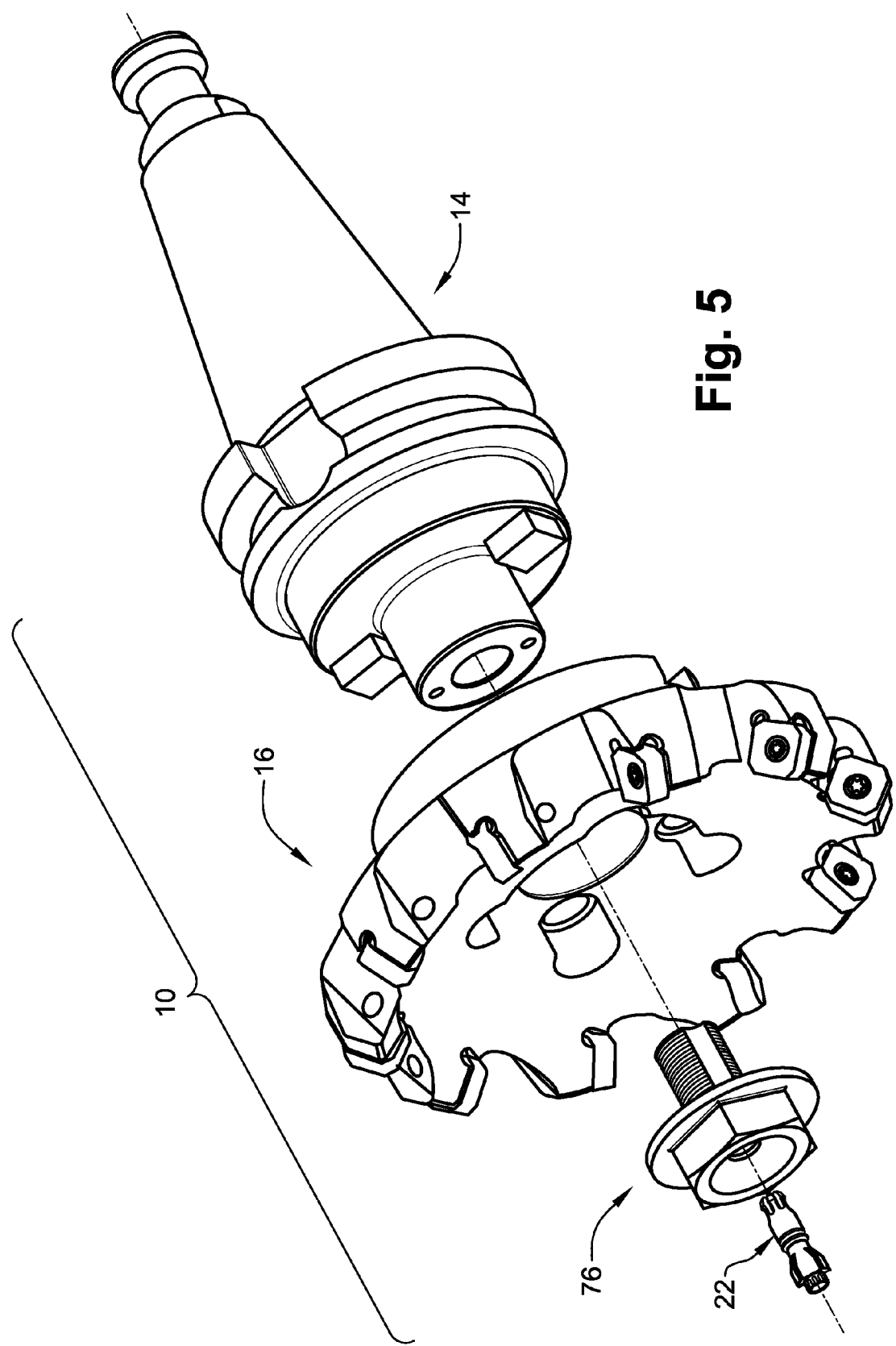
FIG. 5 shows an exploded view of the cutting tool of FIG. 4.

FIGS. 1 and 4 show a face milling cutting tool 10 having a longitudinal tool axis A which defines a forward direction F and a rear direction R. Each part of the cutting tool 10 is described herein according to its respective orientation in the cutting tool 10 and in relation to the tool axis A. It should be noted that directional terms such as "forward", "rear," and the like are for illustrative purposes only and are not intended to limit the scope of the appended claims.

The cutting tool 10 includes a tool holder 12, 14, a face milling cutting head 16 having a plurality of cutting inserts 18, an adaptor 20, 76, and a nozzle 22. The adaptor 20, 76, secures the cutting head 16 to a forward end of the tool holder 12, 14 and accommodates the nozzle 22 at a forward end thereof.

The nozzle 22 may be any means, industrial or non-industrial, that is capable of transferring and distributing fluid forwardly or towards the cutting inserts 18 by separate fluid streams, spray, fog, and the like as are known in the art and need no further description herein.

The adaptor 20, 76, provides a fluid path therethrough, thereby enabling fluid flowing from the tool holder 12, 14 to be distributed at a forward end of the cutting tool 10 via the nozzle 22. The fluid may be a cooling liquid that is supplied for the purpose of cooling the cutting inserts and/or the workpiece being machined. In other cases, the fluid may consist of air with a mist of oil for providing both lubrication and cooling. In other approaches, cooling gases may form the fluid. The cooling fluid may provide the further benefit of removing chips formed by the cutting inserts 18 during the machining of the workpiece.

Figure 2:
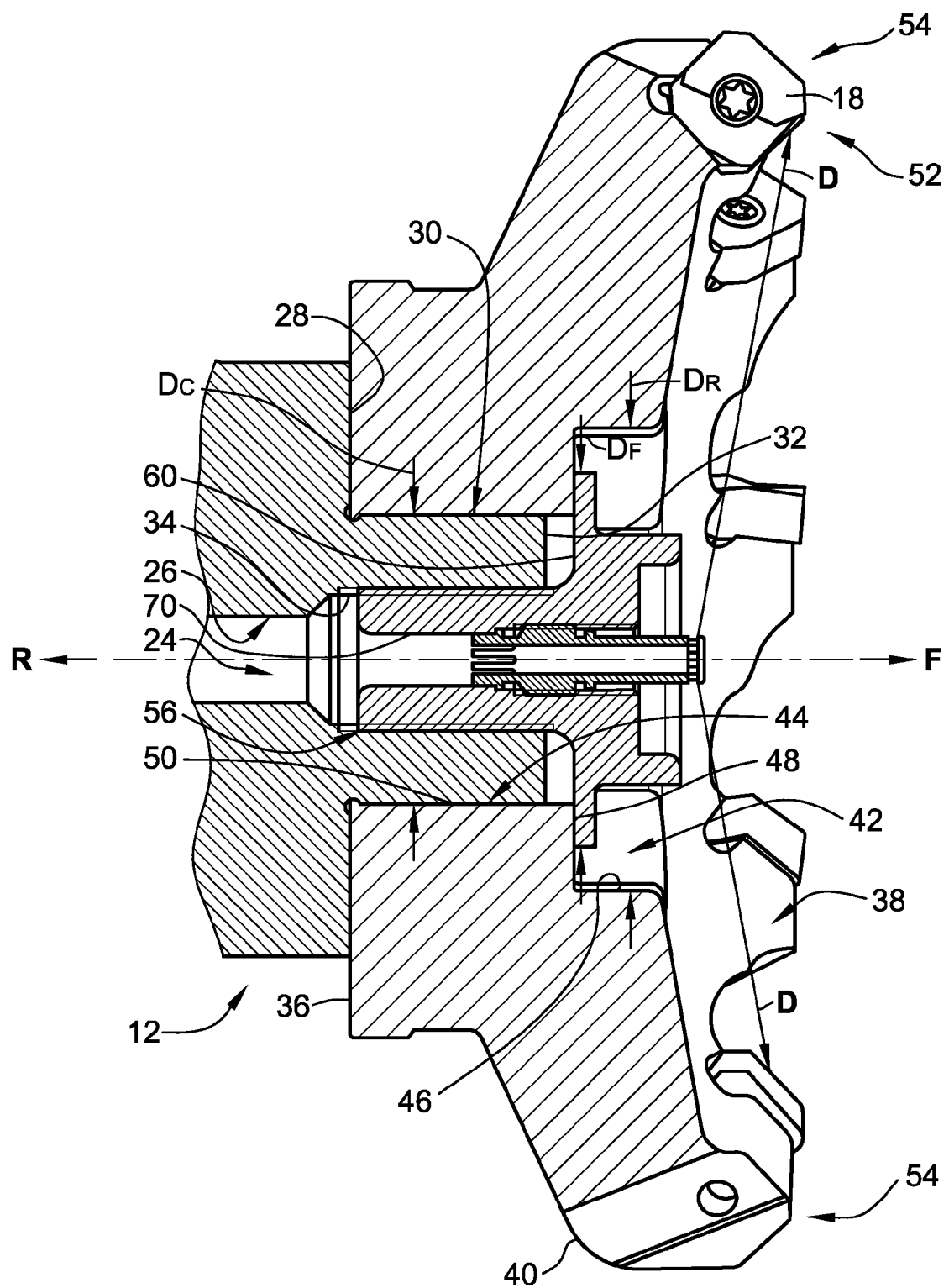
FIG. 2 shows a cross sectional view taken in the plane N-N of the cutting tool of FIG. 1 according to a first exemplar embodiment.

FIG. 2 shows an example first tool holder 12 upon which the cutting head 16 may be secured. The first tool holder 12 is an HSK type tool holder which may be provided with an internal holder channel 24 that has a generally cylindrical holder wall 26 extending axially along the tool axis A. The tool holder 12 has a holder face 28 and a generally cylindrical shaft 30 having a forwardly facing shaft face 32. The holder face 28 faces forwardly, and the shaft 30 extends axially forwardly from the holder face 28 along the tool axis A to the shaft face 32. The holder wall 26 extends through the tool holder 12 and opens out to the shaft face 32. A holder thread 34 is formed on a forward portion of the holder wall 26.

The cutting head 16 has a rearwardly facing support face 36 at a rear end thereof, a forwardly facing head face 38, and a peripheral side surface 40 extending therebetween. A recess 42 and a cavity 44 are formed in the cutting head 16 along the tool axis A. The recess 42 has a generally cylindrical recess wall 46 having a recess diameter $D_R$ and a stop wall 48 which is perpendicular to the recess wall 46. The recess wall 46 extends axially forwardly from the stop wall 48 and opens out to the head face 38. The cavity 44 has a generally cylindrical cavity wall 50 having a cavity diameter $D_C$ that extends axially, opens out to the support face 36, and communicates with the recess 42 via the stop wall 48. The recess diameter $D_R$ is larger than the cavity diameter $D_C$.

A rim 52 of the cutting head 16 is formed at the intersection of the head face 38 and the side surface 40. The cutting inserts 18, which are attached to the cutting head 16 along the rim 52, define a cutting region 54 of the cutting head 16.

The assembly process of the cutting tool 10 wherein the cutting head 16 is assembled on the first tool holder 12 includes placing the cutting head 16 above the first tool holder 12 so that they axially align and the support face 36 of the cutting head 16 faces the holder face 28 of the first tool holder 12. From this position, the cutting head 16 is urged axially rearwardly until the support face 36 and the holder face 28 abut and the shaft 30 is located in the cavity 44.

Figure 3:
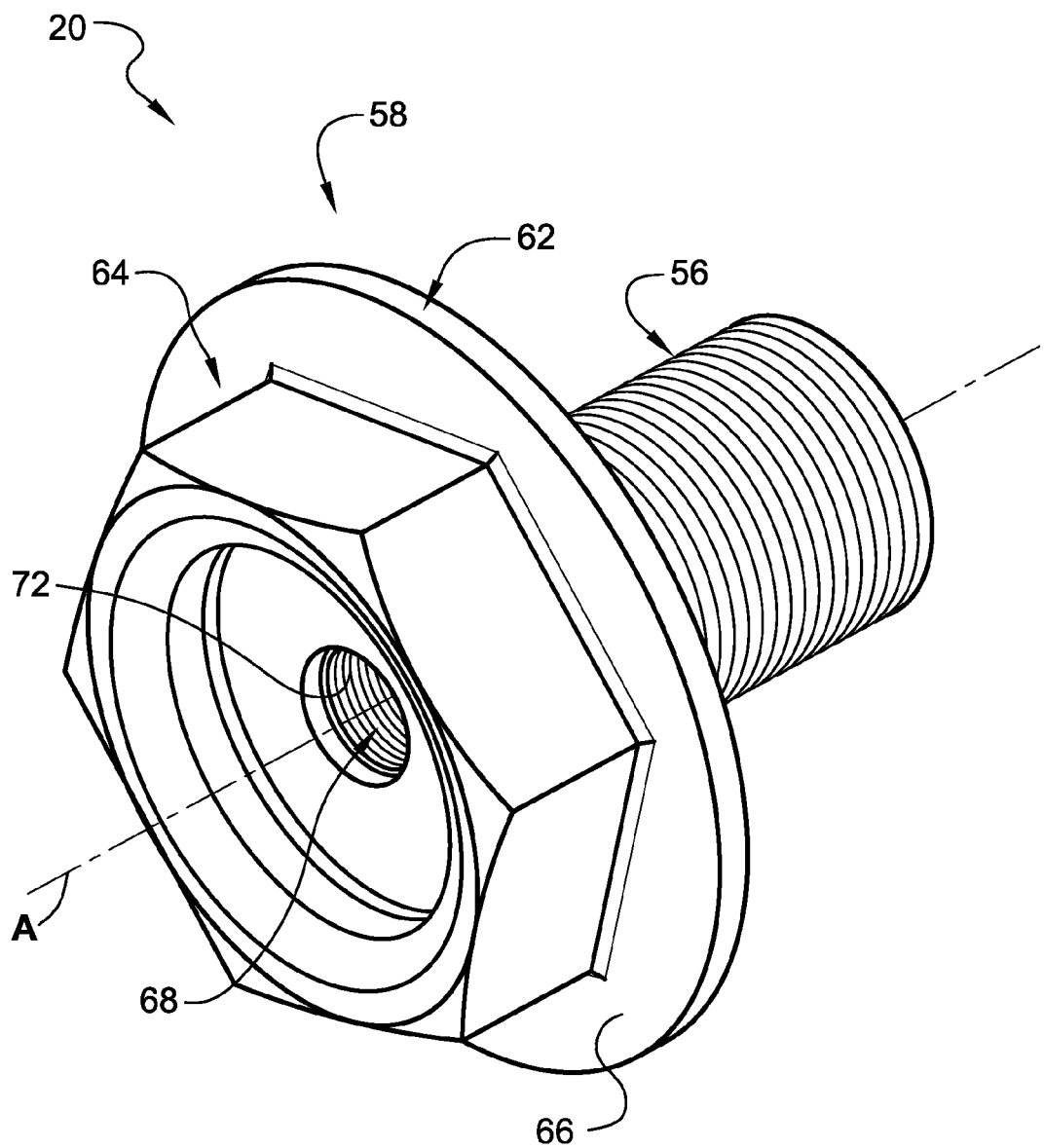
FIG. 3 shows a perspective view of an adaptor of the cutting tool of FIG. 2.

With reference to FIG. 3, a first embodiment of the adaptor 20 has a rear threaded rod 56 and a forward cap 58. The cap 58 has a rearwardly facing cap face 60 (seen in FIG. 2). The threaded rod 56 extends axially rearwardly from the cap face 60 along the tool axis A. The cap 58 additionally has a rear generally cylindrical flange 62 having a flange diameter $D_F$ (FIG. 2) and a forward hexagonal head 64. The flange 62 extends axially along the tool axis A to a forwardly facing flange face 66, and the head 64 extends forwardly from the flange face 66 along the tool axis A to a forward end of the adaptor 20. The adaptor 20 has an adaptor channel 68 having a generally cylindrical adaptor wall 70 that extends axially through the adaptor 20 along the tool axis A. A forward portion of the adaptor wall 70 forms an adaptor thread 72. The flange diameter $D_F$ is larger than the channel diameter $D_C$ and smaller than the recess diameter $D_R$.

The cutting tool 10 of this embodiment is assembled by screwing the threaded rod 56 of the adaptor 20 into the holder thread 34 of the first tool holder 12 until the cap face 60 of the adaptor 20 bears against the stop wall 48 of the cutting head 16, thereby securing the cutting head 16 to the first tool holder 12. In this position, the adaptor channel 68 is in fluid communication with the holder channel 24. The nozzle 22 may then be screwed into the adaptor thread 72 to distribute fluid flowing from the first tool holder 12 in a distribution direction D towards the cutting region 54 of the cutting head 16.

FIG. 4 shows a second example of a tool holder 14 upon which the cutting head 16 may be secured. The second tool holder 14 is a BT type tool holder that, similarly to the first tool holder 12, has a holder face 28 and a cylindrical shaft 30 having a forwardly facing shaft face 32. The holder face 28 faces forwardly, and the shaft 30 extends axially forwardly from the holder face 28 along the tool axis A to the shaft face 32. The second tool holder 14 has a pair of front holder channels 74 that extend axially forwardly through the shaft 30 and open out through the shaft face 32.

The assembly process of the cutting tool 10 with the second tool holder 14 is performed in a similar manner to the assembly process with the first tool holder 12. The cutting head 16 is placed above the second tool holder 14 so that they axially align and the support face 36 of the cutting head 16 faces the holder face 28 of the second tool holder 14. From this position, the cutting head 16 is urged axially rearwardly until the support face 36 and the holder face 28 abut and the shaft 30 is located in the cavity 44 of the cutting head 16.

Figure 6:
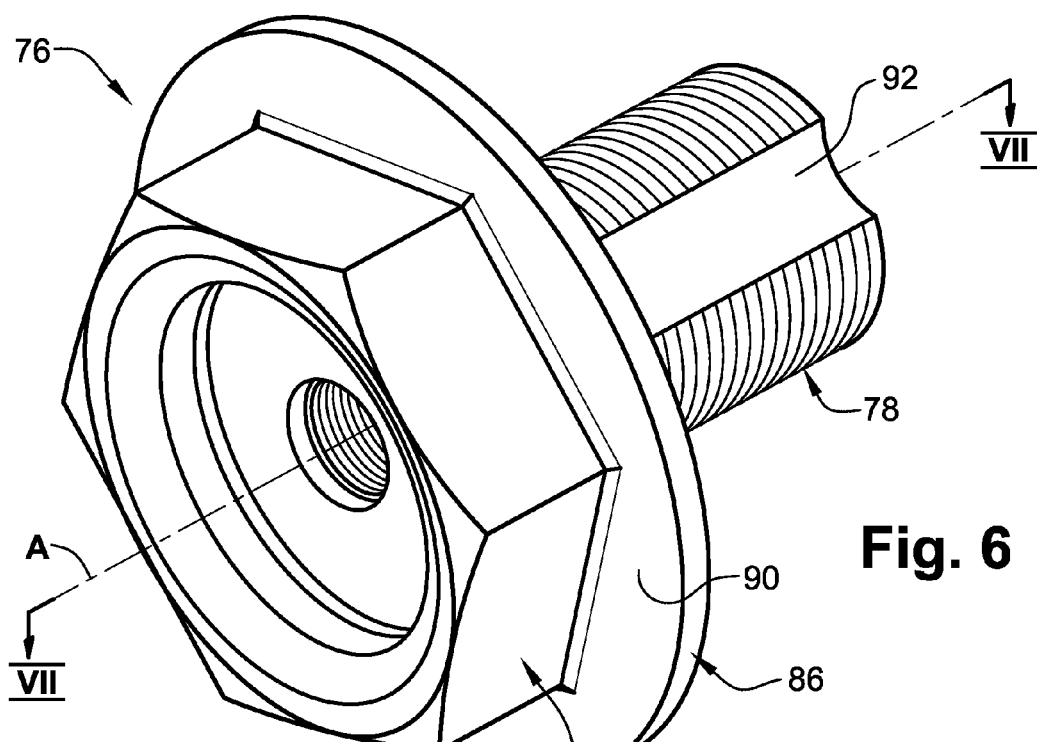
FIG. 6 shows a perspective view of the adaptor shown in FIG. 4.
Figure 7:
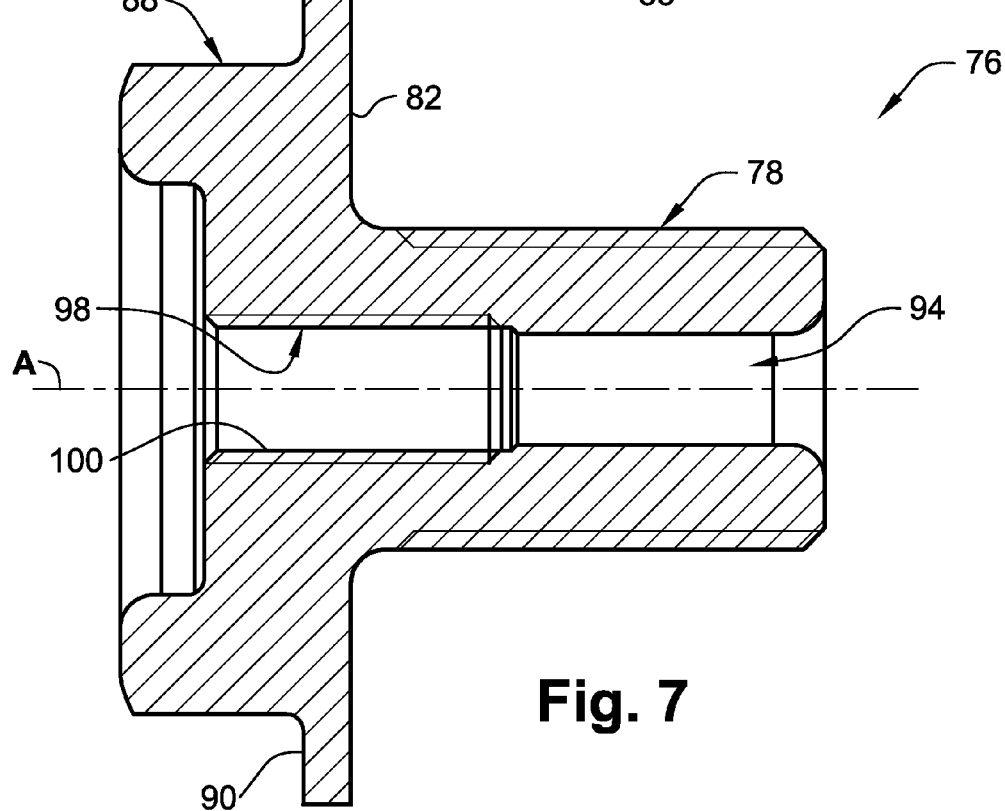
FIG. 7 shows a cross sectional view of the adaptor taken along the plane VII-VII of FIG. 6.

FIGS. 6 and 7 show a second embodiment of the adaptor 76. The adaptor 76 has a rear threaded rod 78 and a forward cap 80. The cap 80 has a rearwardly facing cap face 82 (seen in FIG. 4). The threaded rod 78 extends axially rearwardly from the cap face 82 along the tool axis A to a rearwardly facing rod face 84 (FIG. 4). The cap 80 additionally has a rear cylindrical flange 86 having a flange diameter $D_F$ (FIG. 4) and a forward hexagonal head 88. The flange 86 extends axially along the tool axis A to a forwardly facing flange face 90, and the head 88 extends forwardly from the flange face 90 along the tool axis A to a forward end of the adaptor 76.

The adaptor 76 has two side adaptor channels 92 and a main adaptor channel 94. The side adaptor channels 92 are symmetrically formed about the tool axis A on a peripheral surface of the threaded rod 78.

Each side adaptor channel 92 extends axially rearwardly from a channel forward ending 96 (seen in FIG. 4) along the peripheral surface of the threaded rod 78 and opens out to the rod face 84. The main adaptor channel 94 has a cylindrical main adaptor wall 98 that extends axially through the adaptor 76 along the tool axis A. A forward portion of the main adaptor wall 98 forms a main adaptor thread 100.

In the final assembled position of the cutting tool 10 having the second tool holder 14, the threaded rod 78 of the adaptor 76 is screwed into the holder thread 34 of the second tool holder 14 until the cap face 82 of the adaptor 76 bears against the stop wall 48 of the cutting head 16, thereby securing the cutting head 16 to the second tool holder 14. In this final assembled position, a gap 102 is formed between the cap face 82 of the adaptor 76 and the shaft face 32 of the second tool holder 14. The gap 102 is in fluid communication with the front holder channels 74 and the side adaptor channels 92. Therefore, fluid flowing from the second tool holder 14 towards the cutting region 54 of the cutting tool 10 will flow forwardly through the front holder channels 74, through the gap 102, rearwardly through the side adaptor channels 92, and forwardly again through the main adaptor channel 94 until reaching the nozzle 22. The nozzle 22 is threadingly engaged in the main adaptor thread 100.

Figure 8:
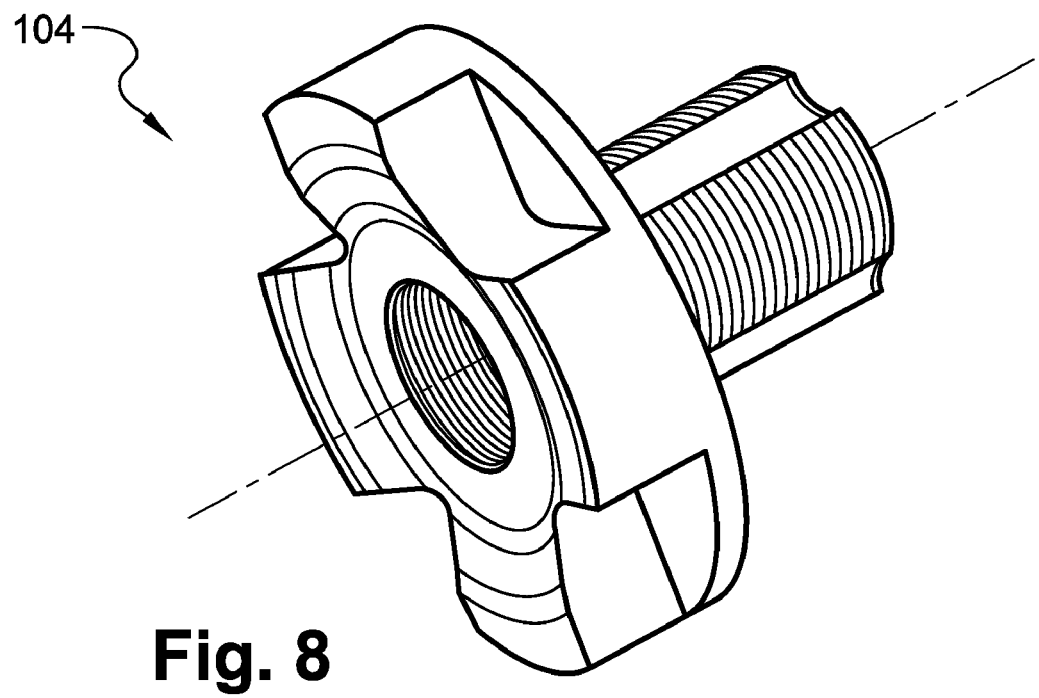
FIG. 8 shows a perspective view of a third exemplar embodiment of an adaptor.
Figure 9:
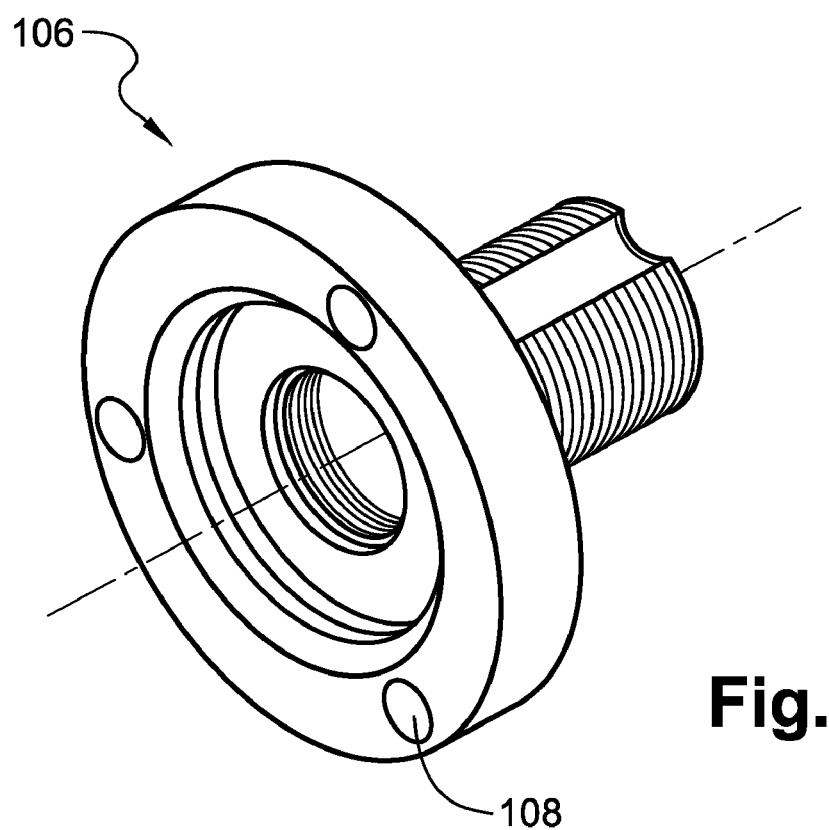
FIG. 9 shows a perspective view of a fourth exemplar embodiment of an adaptor.

FIGS. 8 and 9 show respectively a third 104 and a fourth 106 example embodiments of the adaptor. The third and the fourth embodiments 104, 106 of the adaptor are similar to the second embodiment 76 of the adaptor with the exception of the shape of the head 88. In the third embodiment of the adaptor 104 (FIG. 8), the head 88 is of a general X shape, and in the fourth embodiment of the adaptor 106 (FIG. 9), the head 88 is of a general cylindrical shape having three key ways 108 at a forward end thereof.

Figure 10:
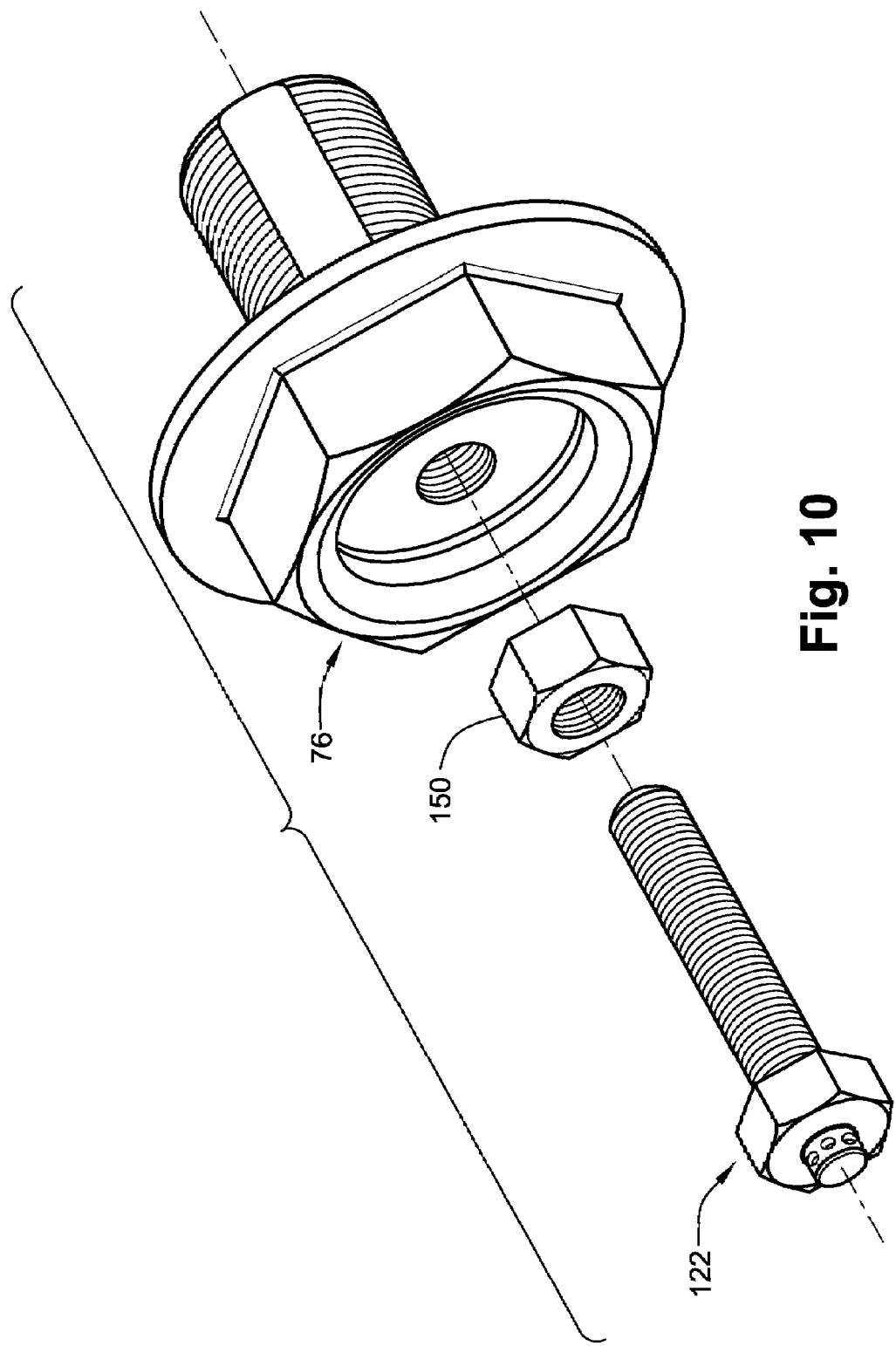
FIG. 10 shows an exploded view of an embodiment of the adaptor of FIG. 6 assembled with a nozzle secured by a lock-nut.

FIG. 10 shows an embodiment of the adaptor 76 assembled with a nozzle 122 that is secured by a lock-nut 150. The nozzle 122 screws into the adaptor 76 and is locked by the lock-nut 150, which allows for controlling an overhang of the nozzle 122 from the adaptor 76. So configured, and thus a fluid flow distribution to a cutting region can be controlled, at least in part, through control of the overhang.

Although the above embodiments have been described to a certain degree of particularity, it should be understood that various alterations, modifications, and combinations could be made without departing from the scope of the disclosure as hereinafter claimed. For example, the lock-nut configuration for the nozzle can be applied to nearly any embodiment. Similarly, any standard or non-standard tool holder provided with an internal channel for fluid may be used in connection with the teachings of this disclosure. Such modifications, alterations, and combinations of the disclosed elements are to be viewed as being within the ambit of the inventive concept.

The invention claimed is:

1. An adaptor for a cutting tool comprising:
    a rod defining a fluid path;
    a cap attached to an end of the rod;
    the rod and the cap defining a fluid path;
    at least part of the cap being configured to support a nozzle to deliver fluid from the fluid path to a cutting area;
    wherein the cap has a radial dimension of sufficient dimension to engage a cutting head and the rod has a length of sufficient dimension to engage a tool holder, a combination thereof linking the cutting-head to the tool holder in an axial direction; and
    wherein the rod defines an internal adaptor thread defined by at least a portion of the fluid path proximal to the cap wherein the internal adaptor thread is configured to engage a nozzle for directing fluid from the fluid path to at least a portion of the cutting tool.

2. The adaptor of claim 1 wherein the rod comprises a peripherally threaded rod wherein the peripherally threaded rod is configured to engage a tool holder.

3. The adaptor of claim 1 wherein the cap comprises a flange and a head through which the fluid path extends wherein the flange is configured to secure at least a portion of a cutting tool to a cutting tool holder such that the fluid path of the rod is in fluid communication with a fluid source associated with the cutting tool holder.

4. The adaptor of claim 3 wherein the fluid source is at least one holder channel defined by the cutting tool holder.

5. The adaptor of claim 4 wherein the holder channel is generally co-axial with the fluid path.

6. The adaptor of claim 3 wherein the head comprises at least one of a group comprising a hexagonal head, a general X shape, and a general cylindrical shape having a plurality of key ways.

7. An adaptor for a cutting tool comprising:
a rod defining a fluid path;
a cap attached to an end of the rod;
the rod and the cap defining a fluid path;
at least part of the cap being configured to support a nozzle to deliver fluid from the fluid path to a cutting area; and
wherein the cap has a radial dimension of sufficient dimension to engage a cutting head and the rod has a length of sufficient dimension to engage a cutting tool holder, a combination thereof linking the cutting-head to the cutting tool holder in an axial direction; and
wherein the adaptor further comprises at least one side adaptor channel defined by the rod wherein the at least one side adaptor channel is in fluid communication with the fluid path and a fluid source associated with the cutting tool holder when the adaptor secures a cutting tool to the cutting tool holder.

8. The adaptor of claim 7 wherein the rod defines an internal adaptor thread defined by at least a portion of the fluid path proximal to the cap wherein the internal adaptor thread is configured to engage a nozzle for directing fluid from the fluid path to at least a portion of the cutting tool.

9. The adaptor of claim 1 further comprising a lock-nut for securing a nozzle to the cap.

10. An adaptor configured to connect a tool holder to a cutting head, the adaptor comprising:
a rod having a peripheral thread, the rod having a length dimension sufficient to engage a tool holder; and
a cap formed at one end of the rod, the cap having a radial dimension sufficient to engage a cutting head; wherein:
the rod and the cap together have at least one fluid path;
the rod has an internal adaptor thread which extends along at least a portion of the at least one fluid path; and
the internal adaptor thread is configured to engage a nozzle for directing fluid from the fluid path to at least a portion of the cutting tool.

11. The adaptor of claim 10, further comprising:
at least one side adaptor channel extending along a peripheral surface of the rod.

12. The adaptor of claim 10, further comprising:
a main adaptor channel having a cylindrical main adaptor wall, a forward portion of the main adaptor wall comprising the internal adaptor thread.

13. A cutting tool comprising:
a tool holder;
a cutting head; and
an adaptor securing the cutting head to the tool holder, the adaptor comprising:
a rod having a peripheral thread, the rod having a length dimension sufficient to engage the tool holder; and
a cap formed at one end of the rod, the cap having a radial dimension sufficient to engage the cutting head; wherein:
the rod and the cap together have at least one fluid path;
the rod has an internal adaptor thread which extends along at least a portion of the at least one fluid path; and
the internal adaptor thread is configured to engage a nozzle for directing fluid from the fluid path to at least a portion of the cutting tool.

14. The cutting tool of claim 13, further comprising:
a nozzle screwed into the internal adaptor thread of the adaptor.

15. The cutting tool of claim 13, further comprising:
a locknut securing the nozzle to the adaptor.

16. The cutting tool of claim 13, wherein:
the cap comprises a flange and a head through which the at least one fluid path extends;
the flange abuts a stop wall of the cutting head, such that the at least one fluid path is in fluid communication with a fluid source associated with the cutting tool holder.

17. The cutting tool of claim 16, wherein:
the fluid source is at least one holder channel defined by the cutting tool holder.

18. The cutting tool of claim 17, wherein:
the at least one holder channel is generally co-axial with the at least one fluid path.

19. The cutting tool of claim 13, wherein:
the adaptor further comprises:
at least one side adaptor channel extending along a peripheral surface of the rod; and
a main adaptor channel having a cylindrical main adaptor wall, a forward portion of the main adaptor wall comprising the internal adaptor thread; and
the at least one side adaptor channel is in fluid communication with the at least one fluid path and a fluid source associated with the cutting tool holder.

20. The cutting tool of claim 19, wherein:
the tool holder is BT type tool holder.

* * * * *